(12) United States Patent
Shin

(10) Patent No.: US 10,815,926 B2
(45) Date of Patent: Oct. 27, 2020

(54) ENGINE CONTROL METHOD FOR VEHICLE

(71) Applicants: Hyundai Motor Company, Seoul (KR); Kia Motors Corporation, Seoul (KR)

(72) Inventor: Buom Sik Shin, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/359,453

(22) Filed: Mar. 20, 2019

(65) Prior Publication Data

US 2020/0173390 A1 Jun. 4, 2020

(30) Foreign Application Priority Data

Nov. 30, 2018 (KR) .................. 10-2018-0151507

(51) Int. Cl.
| | |
|---|---|
| *F02D 41/26* | (2006.01) |
| *F02M 26/42* | (2016.01) |
| *F02M 26/05* | (2016.01) |
| *F02D 41/00* | (2006.01) |
| *F02B 37/24* | (2006.01) |
| *F02M 26/06* | (2016.01) |

(52) U.S. Cl.
CPC .............. *F02D 41/26* (2013.01); *F02B 37/24* (2013.01); *F02D 41/0007* (2013.01); *F02D 41/0077* (2013.01); *F02M 26/05* (2016.02); *F02M 26/06* (2016.02); *F02M 26/42* (2016.02)

(58) Field of Classification Search
CPC ............. F02D 2009/0276; F02D 41/26; F02D 41/0007; F02D 41/0047; F02D 41/0072; F02D 41/0077; F02M 26/05; F02M 26/06; F02M 26/42; F02B 37/24
See application file for complete search history.

(56) References Cited

U.S. PATENT DOCUMENTS

| | | | |
|---|---|---|---|
| 7,016,779 B2 * | 3/2006 | Bowyer | ............... F02D 41/0007 701/108 |
| 7,165,399 B2 | 1/2007 | Stewart | |
| 7,591,135 B2 | 9/2009 | Stewart | |
| 9,562,484 B2 | 2/2017 | Huang et al. | |
| 9,581,080 B2 | 2/2017 | Huang et al. | |

(Continued)

FOREIGN PATENT DOCUMENTS

| | | |
|---|---|---|
| JP | 2017-129120 A | 7/2017 |
| KR | 2016-0102746 A | 8/2016 |
| KR | 101857276 B1 | 5/2018 |

*Primary Examiner* — Jesse S Bogue
*Assistant Examiner* — Loren C Edwards
(74) *Attorney, Agent, or Firm* — Mintz Levin Cohn Ferris Glovsky and Popeo, P.C.; Peter F. Corless

(57) ABSTRACT

An engine control method for a vehicle is provided. The method includes securing target control values for a plurality of control objects related to an air path in an engine and calculating operation amounts of actuators for the control objects. The operation amounts minimize an objective function including the sum of resultant object components obtained by summing, for a predetermined reference time, squares of a difference between the target control values and prediction model functions for the control objects. The actuators are then driven based on the calculated operation values.

15 Claims, 6 Drawing Sheets

(56) References Cited

U.S. PATENT DOCUMENTS

2004/0050375 A1* 3/2004 Arnold .................. F02B 37/18
              123/568.12
2017/0363032 A1  12/2017 Rodgers et al.

* cited by examiner

ENGINE CONTROL METHOD FOR VEHICLE

CROSS-REFERENCE TO RELATED APPLICATION

This application claims the priority benefit of Korean Patent Application No. 10-2018-0151507, filed on Nov. 30, 2018, the disclosure of which is incorporated herein by reference.

BACKGROUND

1. Field of the Invention

The present disclosure relates to an engine control method for a vehicle and, more particularly, to a technology of controlling air and gas flowing through an engine.

2. Description of the Prior Art

An automotive engine is an apparatus that generates power by suctioning air and burning fuel. However, the air path in an engine has complexity through a plurality of complex paths, and various actuators that influence the air path in an engine are installed. In other words, an engine is equipped with several actuators such as a throttle valve, variable geometry turbocharger (VGT) vanes, and exhaust gas recirculation (EGR) valve that influence an air path and these actuators are separately controlled to perform their own functions. Separate control of these actuators influence each other, so it may be difficult to secure desired control performance. For example, when VGT vanes are operated to obtain higher boost pressure even though the degree of opening of an EGR valve is maintained at a predetermined level, an EGR amount is undesirably changed.

The matters which have been described as the technology corresponding to the background of the present disclosure are merely for assisting with an understanding of the background of the present disclosure, and should not be considered as the prior art already known to those skilled in the art.

SUMMARY

The present disclosure provides an engine control method for a vehicle, the method being able to secure more accurate and stable control performance by preventing interruption among a plurality of actuators, which may influence an air path in an engine, and by performing general control based on relevance of the actuators.

In accordance with an aspect of the present disclosure, an engine control method for a vehicle may include: securing, by a controller, target control values for a plurality of control objects related to an air path in an engine; calculating, by the controller, operation amounts of actuators for the control objects through real-time optimization considering various factors, the operation amounts minimizing an objective function including the sum of resultant object components obtained by summing, for a predetermined reference time, squares of the difference between the target control values and prediction model functions for the control objects; and driving, by the controller, the actuators based on the calculated operation values.

The prediction model functions for the control objects that constitute the objective function respectively may include the operation amounts of the actuators as variables. The objective function may be configured by further adding resultant rate-of-change components obtained by summing, for the reference time, squares of the rates of change of the operation amounts of the actuators to time. The objective function may be configured by multiplying the resultant object components and the resultant rate-of-change components by weights, respectively. The control objects related to the air path in the engine may include an intake air flow rate through a throttle valve, boost pressure by a turbocharger, and an EGR amount through an EGR valve.

When the engine is equipped with both of a low pressure (LP) EGR system and a high pressure (HP) EGR system, the EGR amount through the EGR valve of the control objects may be expressed by an LP EGR rate of an LP EGR valve and an HP EGR rate of an HP EGR valve for securing the EGR amount. The prediction model functions for the control objects that constitute the objective function may include the opening degree of the throttle valve, the opening degrees of vanes of the turbocharger, the opening degree of the HP EGR valve, and the opening degree of the LP EGR valve as variables.

The objective function may be configured by further adding resultant rate-of-change components obtained by summing, for the reference time, squares of a rate of change of the opening degree of the throttle valve to time, a rate of change of the opening degree of vanes of the turbocharger to time, a rate of change of the opening degree of the HP EGR valve to time, and a rate of change of the opening degree of the LP EGR valve to time. The objective function may be configured by multiplying the resultant object components and the resultant rate-of-change components by weights, respectively.

In accordance with another aspect of the present disclosure, an engine control method for a vehicle may include: obtaining feature data of a road on which a vehicle is driven; determining a driving target vehicle speed; determining a gear stage being able to maximize fuel efficiency by minimizing acceleration/deceleration of the vehicle in accordance with the road feature data and the driving target vehicle speed; and calculating engine speed of the vehicle and a torque profile for maintaining the driving target vehicle speed at the gear stage on the road on which the vehicle is driven, in which target profiles to time of target control values for maintaining the engine speed and the torque profile for a plurality of control objects related to an air path in the engine are secured in the target-securing step.

According to the present disclosure, it may be possible to secure more accurate and stable control performance by preventing interruption among a plurality of actuators, which may influence an air path in an engine, and by performing general control considering relevance of the actuators. Further, it may be possible to improve fuel efficiency of a vehicle and reduce exhaust gas by making it possible to control actuators for a plurality of control objects related to an air path of an engine to be able to maximize fuel efficiency by minimizing acceleration/deceleration of the engine in consideration of a predictive driving target vehicle speed of the vehicle based on information regarding a road on which the vehicle is driven and a vehicle operation state information by a driver. This vehicle operation state may be selected by driver through a specific switch options.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
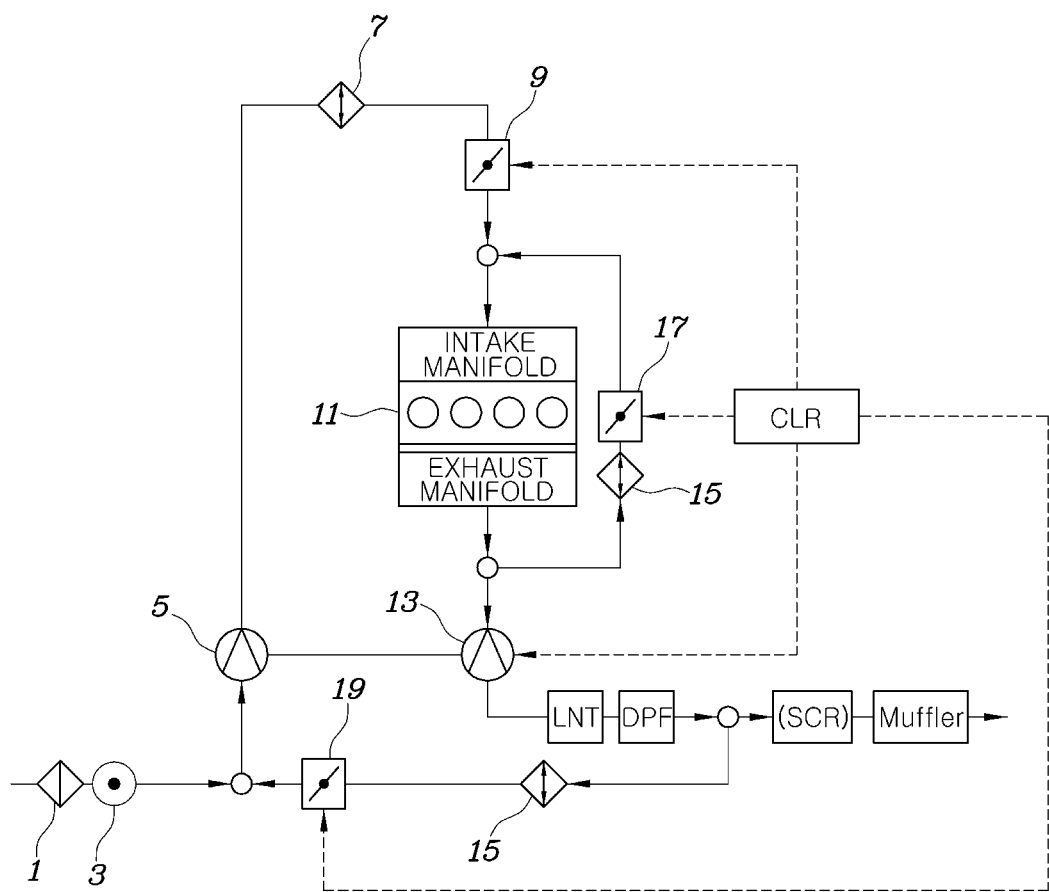
FIG. 1 is a view showing an example of an engine system of a vehicle according to an exemplary embodiment of the present disclosure.

Referring to FIG. 1 showing an example of an engine system of a vehicle to which the present disclosure may be applied, air that has passed through an air filter 1 may be gauged by an air flow sensor 3, compressed by a compressor 5 of a turbocharger, cooled by an intercooler 7, and then supplied to an intake manifold of an engine 11 through a throttle valve 9. Exhaust gas discharged from an exhaust manifold of the engine drives a turbine 13 of the turbocharger and then may be discharged to the atmosphere through an lean nox trap (LNT), a diesel particulate filter (DPF), a selective catalytic reduction (SCR), and a muffler.

Some of the exhaust gas discharged from the exhaust manifold of the engine is cooled by an EGR cooler 15 of an HP EGR system and then input to the front of the intake manifold through an HP EGR valve 17. Some of the exhaust gas at the rear end of the DPF may be cooled by an EGR cooler 15 of an LP EGR system and then supplied to the front end of the compressor 5 through an LP EGR valve 19. The turbocharger may be a variable geometry turbocharger (VGT), vanes may be disposed in the turbine with adjustable angles adjusted by a controller, and the opening degrees of the LP EGR valve 19, the HP EGR valve 17, and the throttle valve 9 may be operated by the controller. The controller may be an engine control unit (ECU).

Figure 2:
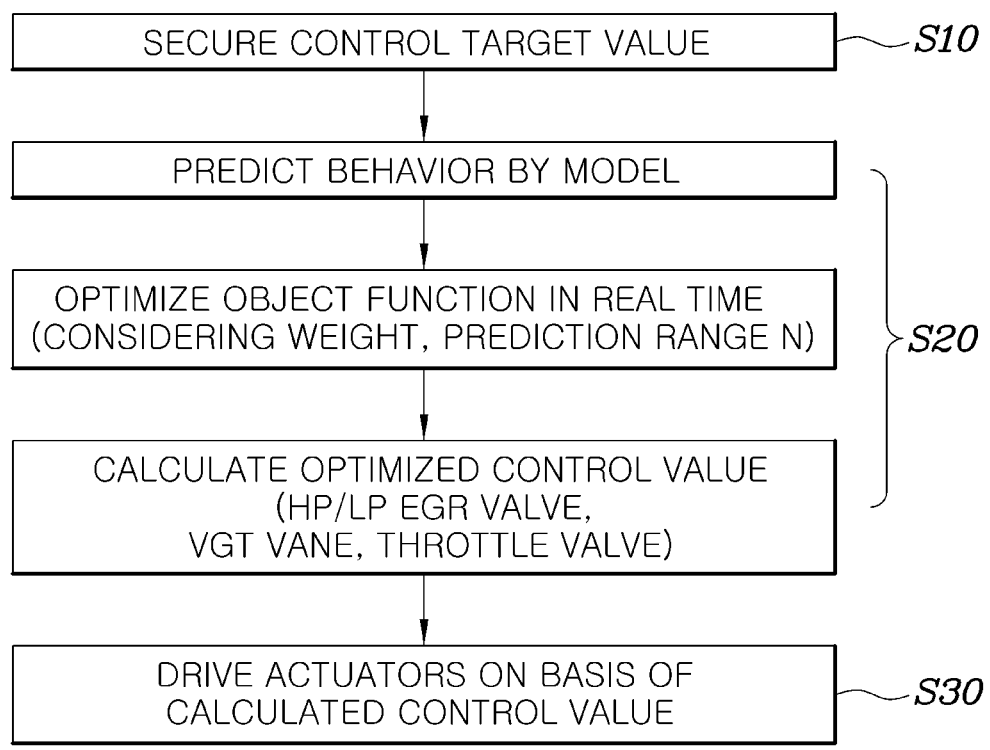
FIG. 2 is a flowchart showing an embodiment of an engine control method for a vehicle according to an exemplary embodiment of the present disclosure.
Figure 3:
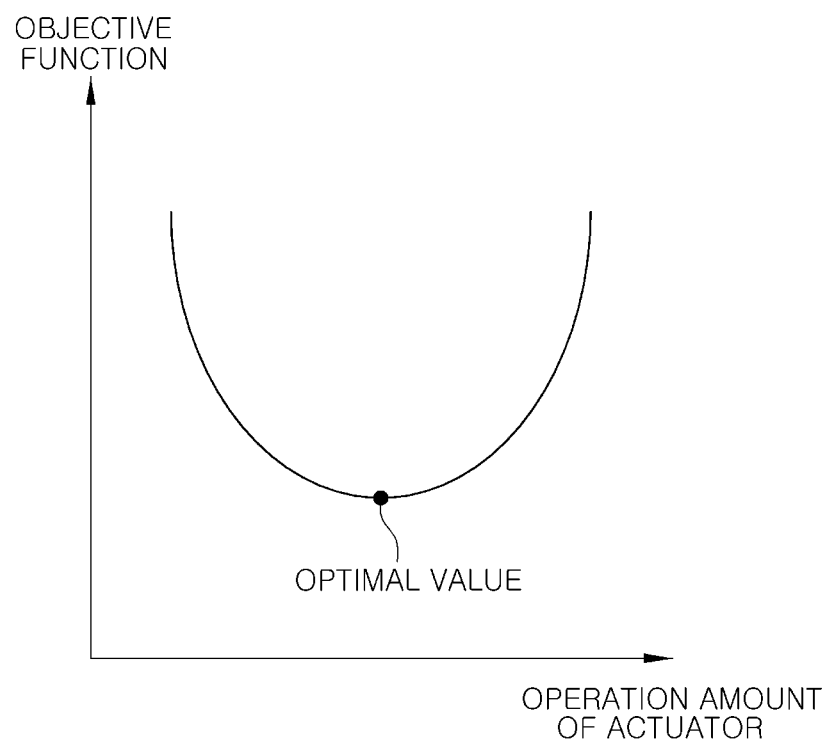
FIG. 3 is a graph for illustrating the concept of an objective function according to an exemplary embodiment of the present disclosure.
Figure 4:
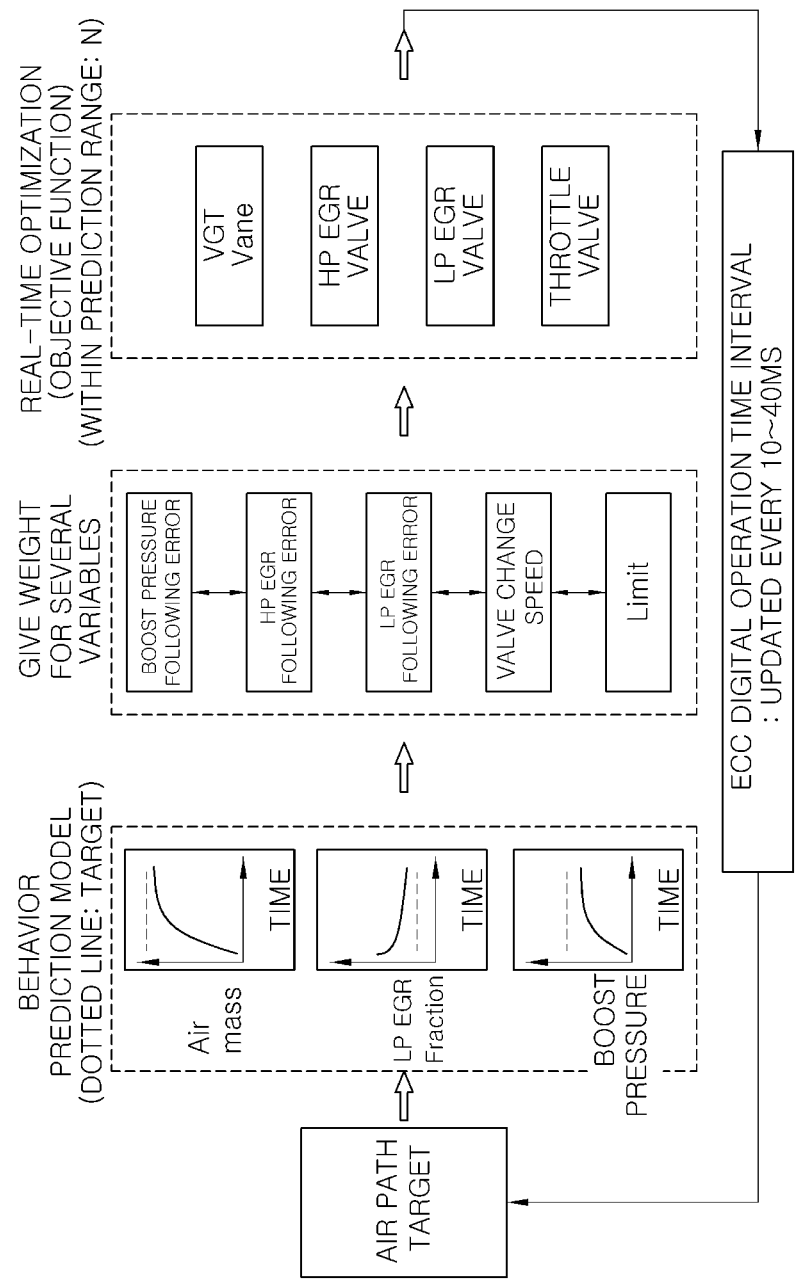
FIG. 4 is a block diagram illustrating an exemplary embodiment of the present disclosure.

Referring to FIGS. 2 to 4, an exemplary embodiment of an engine control method for a vehicle of the present disclosure may include: securing, by a controller, target control values for a plurality of control objects related to an air path in an engine (S10); calculating, by the controller, operation amounts of actuators for the control objects, the operation amounts minimizing an objective function including the sum of resultant object components obtained by summing, for a predetermined reference time, squares of the difference between the target control values and prediction model functions for the control objects (S20); and driving, by the controller, the actuators based on the calculated operation values (S30).

The control objects related to the air path in the engine may include the intake air flow rate through the throttle valve 9, boost pressure by the turbocharger, and the EGR amount through the EGR valve. In other words, the controller, depending on the operation state of a vehicle, may be configured to determine target control values for control objects related to the air path in an engine, calculate the operation amounts of actuators for the control objects using the objective function, and then operate the actuators based on the operation amounts, thereby preventing interruption among the actuators due to separate operation thereof and performing general control considering relevance. Accordingly, more accurate and stable control performance for the control objects may be secured.

In the target-securing step, the target control values for the control objects may be determined by technologies known in the art in consideration of the current operating point, fuel amount, and torque of the engine, driver's requirements, etc. In the exemplary embodiment, when the engine is equipped with both of a low pressure exhaust gas recirculation system (LP EGR system) and a high pressure exhaust gas recirculation system (HP EGR system), the exhaust gas recirculation (EGR) amount through the EGR valve of the control objects may be expressed by an LP EGR rate of the LP EGR valve and an HP EGR rate of the HP EGR valve for securing the EGR amount.

The prediction model functions for the control objects that constitute the objective function respectively include the operation amounts of the actuators as variables. In other words, the prediction model functions for the control objects that constitute the objective function may include the opening degree of the throttle valve 9, the opening degrees of vanes of the turbocharger, the opening degree of the HP EGR valve, and the opening degree of the LP EGR valve as variables.

The prediction model functions may be expressed as follows.

The prediction model function for the intake air flow rate may be expressed as:

Air mass flow rate$_{estimated}$=f(opening degree of throttle valve, opening degrees of vanes of turbocharger, opening degree of HP EGR valve, and opening degree of LP EGR valve).

The prediction model function for the boost pressure may be expressed as:

Boost pressure$_{estimated}$=f(opening degree of throttle valve, opening degrees of vanes of turbocharger, opening degree of HP EGR valve, and opening degree of LP EGR valve).

The prediction model function for the HP EGR rate may be expressed as:

HP EGR rate$_{estimated}$=f(opening degree of throttle valve, opening degrees of vanes of turbocharger, opening degree of HP EGR valve, and opening degree of LP EGR valve).

The prediction model function for the LP EGR rate may be expressed as:

LP EGR rate$_{estimated}$=f(opening degree of throttle valve, opening degrees of vanes of turbocharger, opening degree of HP EGR valve, and opening degree of LP EGR valve).

The objective function is configured by further adding resultant rate-of-change components obtained by summing, for the reference time, the squares of the rates of change of the operation amounts of the actuators to time. In other words, the objective function may be configured by further adding resultant rate-of-change components obtained by summing, for the reference time, the squares of the rate of change of the opening degree of the throttle valve to time, the rate of change of the opening degree of vanes of the turbocharger to time, the rate of change of the opening degree of the HP EGR valve to time, and the rate of change of the opening degree of the LP EGR valve to time.

The objective function is configured by multiplying the resultant object components and the resultant rate-of-change components by weights, respectively. In summary, the objective function may be expressed as the following equation. In the following equation, t=1 is the current time and t=N is predetermined time from the present time.

Objective function =

$$\sum_{t=1}^{t=N} (\text{Air mass flow rate}_{target} - \text{Air mass flow rate}_{estimated})^2 \cdot W_{air} +$$

$$\sum_{t=1}^{t=N} (\text{Boost pressure}_{target} - \text{Boost pressure}_{estimated})^2 \cdot W_{boost\ pressure} +$$

-continued $$\sum_{t=1}^{t=N} (\text{HP EGR rate}_{target} - \text{HP EGR rate}_{estimated})^2 \cdot W_{HP\ EGR\ rate} +$$

$$\sum_{t=1}^{t=N} (\text{LP EGR rate}_{target} - \text{LP EGR rate}_{estimated})^2 \cdot W_{LP\ EGR\ rate} +$$

$$\sum_{t=1}^{t=N} (\Delta VGT\ \text{Vane})^2 \cdot W_{VGT\ Vane} +$$

$$\sum_{t=1}^{t=N} (\Delta HP\ EGR\ \text{valve})^2 \cdot W_{HP\ EGR\ valve} +$$

$$\sum_{t=1}^{t=N} (\Delta LP\ EGR\ \text{valve})^2 \cdot W_{LP\ EGR\ valve} +$$

$$\sum_{t=1}^{t=N} (\Delta \text{Throttle valve})^2 \cdot W_{Throttle\ valve}$$

In the equation, $\Delta$VGT Vane is the rate of change of the opening degree of the vanes of the turbocharger to time, $\Delta$HP EGR valve is the rate of change of the opening degree of the HP EGR valve to time, $\Delta$LP EGR valve is the rate of change of the opening degree of the LP EGR valve to time, $\Delta$Throttle valve is the rate of change of the opening degree of the throttle valve to time. $W_{air}$, $W_{boost\ pressure}$, $W_{HP\ EGR\ rate}$, $W_{LP\ EGR\ rate}$, $W_{VGT\ Vane}$, $W_{HP\ EGR\ valve}$, $W_{LP\ EGR\ valve}$, and $W_{Throttle\ valve}$ are weights for the factors, respectively.

The objective function was configured by obtaining the absolute values of the differences between target values and actual values for the control objects by squaring the differences and the weights were determined to set which actual values are closer to the target values for the control objects.

If the operation values of the actuators are changed too rapidly, excessive energy is applied to the actuators and the actuators may be damaged or vibrated, and thus, the actuators are required to be operated at an appropriate speed to prevent such damage. Accordingly, the rates of change of the operation amounts to time of the actuators are obtained and considered as factors for optimization. Accordingly, the objective function that is an optimization function is configured to be able perform optimization considering estimation of the differences between target control values and estimated values by the prediction model functions, and also changes of the actuators.

Further, optimization for sufficient time is advantageous in reflection of actual phenomenon, but if the time is too long, it is inappropriate due to the limit in calculation ability of the controller and causes slow response. Accordingly, in consideration of this problem, an appropriate optimization range was set by setting N that is optimization range time. The predetermined reference time is the optimization range time N, and for example, the time of t=1~t=N would be set as the level of tens of milliseconds.

In optimization through the objective function, the weights and N corresponding to the optimization range time may have substantial influence on the result together with system characteristics from prediction models. For example, when the weight $W_{air}$ by which the difference between the target and actual values of the air mass is multiplied to rapidly correspond to the air mass is considerably large, the objective function does not converge toward a sufficiently small value even though the air mass flow rate difference is small, and thus, the VGT vanes, HP EGR valve, LP EGR valve, and throttle valve that minimize the air mass flow rate would be optimized. However, when the boost pressure is important, the corresponding weight $W_{boost\ pressure}$ is increased such that the operation values of the corresponding actuators are selected. Further, if the weights are set in consideration of all factors, corresponding item values would be optimized.

The shape of the objective function the arithmetic sum of squares of the differences between the target control values and the prediction model functions for corresponding control objects and squares of the rates of change of the operation amount to time of the actuators, in which the components are positive values, so the objective function has a convex shape, as shown in FIG. 3. The objective function having this shape may be optimized by selecting a point where the derivative is minimally inflected on the downward-convex graph of FIG. 3.

In other words, in the value-calculating step (S20), the operation amounts of the actuators at the point where the derivative of the objective function having the convex shape is minimum may be obtained. Accordingly, it may be possible to maximally reduce the calculation amount of the controller and rapidly induce the optimization result using the objective function. The method of the present disclosure may repeat the target-securing step (S10), the value-calculating step (S20), and the driving step (S30).

Figure 5:
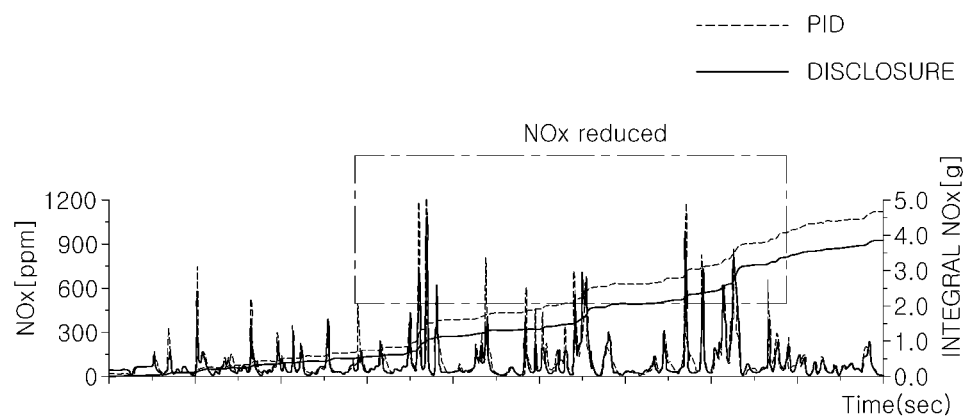
FIGS. 5 and 6 are exemplary graphs showing effects according to an exemplary embodiment of the present disclosure.

FIG. 5 is a graph showing the produced amount of nitrogen oxide to time to compare the result of adjusting the opening degree of a throttle valve, the opening degree of vanes of turbocharger, the opening degree of an HP EGR valve, and the opening degree of an LP EGR valve using a proportional integral differential control (PID control) method and the result of adjusting the opening degrees using the control method of the present disclosure to adjust the intake air flow rate through the throttle valve, boost pressure by the turbocharger, and the EGR amount through an EGR valve while operating an engine in a random test sequence (RTS) 95 mode that is a rapid acceleration/deceleration mode. The graph shows that, as for the integral NOx amount, the produced amount of NOx by the control according to the present disclosure was reduced by about 10%.

Figure 6:
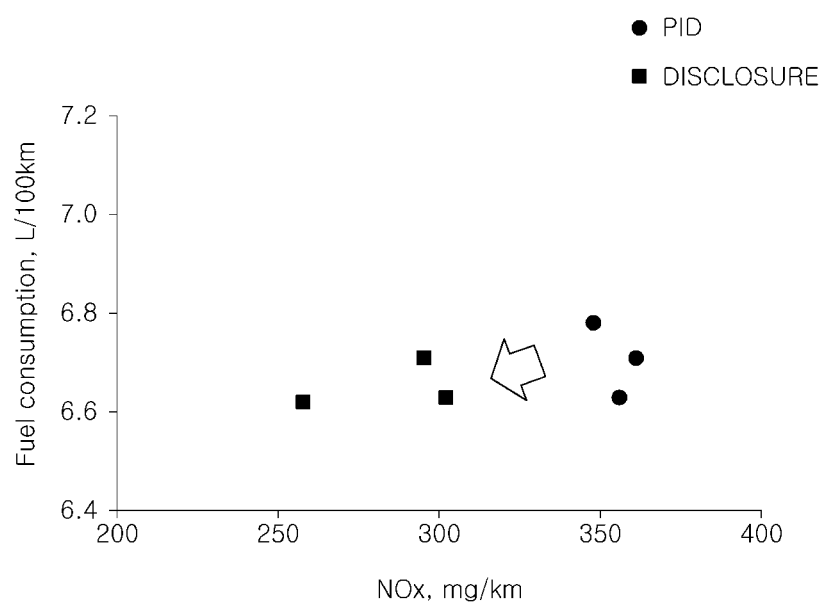

FIG. 6 is a view comparing the test results using a graph of the produced amount of NOx and a fuel consumption amount, and as shown in the figure, the produced amount of NOx, and also the fuel consumption amount were reduced, and thus, the fuel efficiency was improved.

Figure 7:
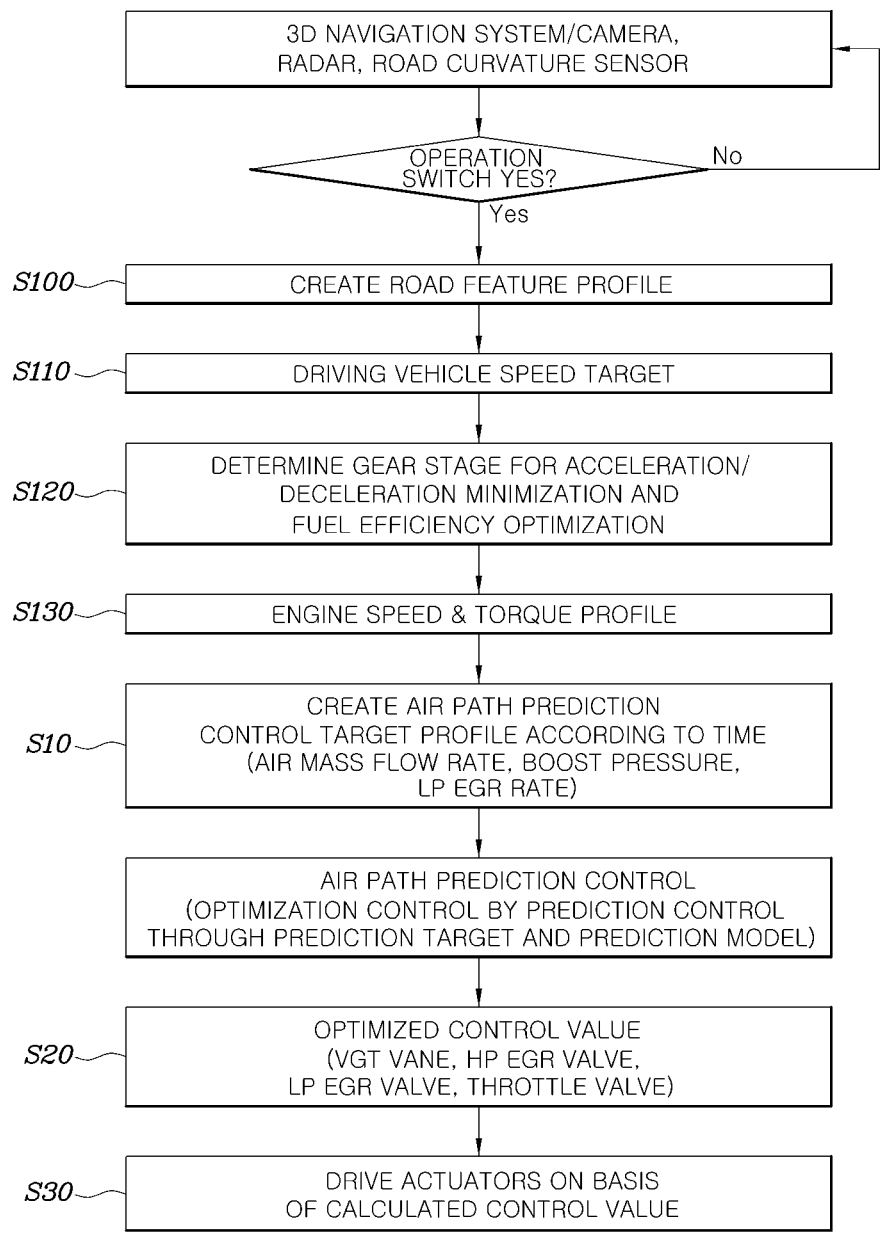
FIG. 7 is a flowchart showing another exemplary embodiment of the present disclosure.

FIG. 7 shows another exemplary embodiment of the engine control method of the present disclosure and the engine control method may include: obtaining, by a controller, feature data of a road on which a vehicle is driven (S100); determining, by the controller, a driving target vehicle speed (S110); determining, by the controller, a gear stage being able to maximize fuel efficiency by minimizing acceleration/deceleration of the vehicle based on the road feature data and the driving target vehicle speed (S120); and calculating, by the controller, engine speed of the vehicle and a torque profile for following or maintaining the driving target vehicle speed at the gear stage on the road on which the vehicle is driven (S130).

According to this method, target profiles to time of target control values for following the engine and the torque profile for a plurality of control objects related to an air path in the engine may be secured and applied to the target-securing step (S10) and then the operation value-calculating step (S20) and the driving step (S30) may be performed together, thereby optimally operating the engine preliminarily in consideration of the information of a road that the vehicle will enter.

Additionally, the road feature-obtaining step (S100) may be started by a specific operation switch for a driver and thus, the control may be progressed by driver's intention. The road feature-obtaining step (S100) may include obtaining features such as a gradient and a curvature of a road that the vehicle will enter from the current road when the operation switch for the driver is turned on, based on information from a 3D navigation system, a camera, a radar, a road curvature sensor, etc. In other words, the vehicle may be able to predict the road on which the vehicle will enter and thus obtain information related to that next road.

In the driving target vehicle speed-determining step (S110), it may be possible to determine a driving target vehicle speed based on the depression extent of an acceleration pedal by the driver, etc. (e.g., an engagement amount of the pedal). In the gear stage-determining step (S120), a gear stage or a gear ratio capable of achieving the driving target vehicle speed may be determined based on the features of the road that the vehicle will enter, depending on the types of transmissions that are used.

The control method may operate the transmission of the vehicle at the gear stage or the gear ratio determined in the gear stage-determining step (S120) while operating control objects, which are related to an air path in the engine to correspond to the engine speed and the torque profile obtained in the engine profile-obtaining step (S130) through the target-securing step (S10), the operation value-calculating step (S20), and the driving step (S30). As described above, by performing optimal control considering the situation of the road that the vehicle will enter while controlling the engine and the transmission, it may be possible to improve the fuel efficiency of the vehicle and reduce exhaust gas.

Although the present disclosure has been described and illustrated with reference to the exemplary embodiments thereof, it will be apparent to those skilled in the art that various improvements and modifications of the present disclosure may be made without departing from the technical idea of the present disclosure provided by the following claims.

What is claimed is:

1. An engine control method for a vehicle, comprising:
   securing, by a controller, target control values for a plurality of control objects related to an air path in an engine of the vehicle;
   calculating, by the controller, operation amounts of actuators for the control objects through real-time optimization considering various factors, wherein the operation amounts minimize an objective function including a sum of resultant object components obtained by summing, for a predetermined reference time, squares of a difference between the target control values and prediction model functions for the control objects; and
   operating, by the controller, the actuators based on the calculated operation amounts,
   wherein the prediction model functions for the control objects that constitute the objective function respectively include the operation amounts of the actuators as variables, and
   wherein the objective function is configured by further adding resultant rate-of-change components obtained by summing, for the reference time, squares of rates of change of the operation amounts of the actuators to time.

2. The method of claim 1, wherein the objective function is configured by multiplying the resultant object components and the resultant rate-of-change components by weights, respectively.

3. The method of claim 1, wherein the control objects related to the air path in the engine include an intake air flow rate through a throttle valve, boost pressure by a turbocharger, and an exhaust gas recirculation (EGR) amount through an EGR valve.

4. The method of claim 3, wherein the engine includes:
a low pressure (LP) EGR system; and
a high pressure (HP) EGR system,
wherein the EGR amount through the EGR valve of the control objects is expressed by an LP EGR rate of an LP EGR valve and an HP EGR rate of an HP EGR valve for securing the EGR amount.

5. The method of claim 4, wherein the prediction model functions for the control objects that constitute the objective function include an opening degree of the throttle valve, opening degrees of vanes of the turbocharger, an opening degree of the HP EGR valve, and an opening degree of the LP EGR valve as the variables.

6. The method of claim 5, wherein the objective function is configured by further adding resultant rate-of-change components obtained by summing, for the reference time, squares of a rate of change of the opening degree of the throttle valve to time, a rate of change of the opening degree of vanes of the turbocharger to time, a rate of change of the opening degree of the HP EGR valve to time, and a rate of change of the opening degree of the LP EGR valve to time.

7. The method of claim 6, wherein the objective function is configured by multiplying the resultant object components and the resultant rate-of-change components by weights, respectively.

8. An engine control method for a vehicle, comprising:
obtaining, by the controller, feature data of a road on which the vehicle is driven;
determining, by the controller, a driving target vehicle speed;
determining, by the controller, a gear stage being able to maximize fuel efficiency by minimizing acceleration and deceleration of the vehicle based on the road feature data and the driving target vehicle speed; and
calculating, by the controller, engine speed of the vehicle and a torque profile for maintaining the driving target vehicle speed at the gear state on the road on which the vehicle is driven,
wherein target profiles to time of the target control values for maintaining the engine speed and the torque profile for the plurality of control objects related to the air path in the engine are secured in the step of securing of the target control values for the plurality of control objects of claim 1.

9. An engine control system for a vehicle, comprising:
a memory configured to store program instructions; and
a processor configured to execute the program instructions, the program instructions when executed configured to:
secure target control values for a plurality of control objects related to an air path in an engine of the vehicle;
calculate operation amounts of actuators for the control objects through real-time optimization considering various factors, wherein the operation amounts minimize an objective function including a sum of resultant object components obtained by summing, for a predetermined reference time, squares of a difference between the target control values and prediction model functions for the control objects; and
operate the actuators based on the calculated operation amounts,
wherein the prediction model functions for the control objects that constitute the objective function respectively include the operation amounts of the actuators as variables, and
wherein the objective function is configured by further adding resultant rate-of-change components obtained by summing for the reference time, squares of rates of change of the operation amounts of the actuators to time.

10. The system of claim 9, wherein the objective function is configured by multiplying the resultant object components and the resultant rate-of-change components by weights, respectively.

11. The system of claim 9, wherein the control objects related to the air path in the engine include an intake air flow rate through a throttle valve, boost pressure by a turbocharger, and an exhaust gas recirculation (EGR) amount through an EGR valve.

12. The system of claim 11, wherein the engine includes:
a low pressure (LP) EGR system; and
a high pressure (HP) EGR system,
wherein the EGR amount through the EGR valve of the control objects is expressed by an LP EGR rate of an LP EGR valve and an HP EGR rate of an HP EGR valve for securing the EGR amount.

13. The system of claim 12, wherein the prediction model functions for the control objects that constitute the objective function include an opening degree of the throttle valve, opening degrees of vanes of the turbocharger, an opening degree of the HP EGR valve, and an opening degree of the LP EGR valve as the variables.

14. The system of claim 13, wherein the objective function is configured by further adding resultant rate-of-change components obtained by summing, for the reference time, squares of a rate of change of the opening degree of the throttle valve to time, a rate of change of the opening degree of vanes of the turbocharger to time, a rate of change of the opening degree of the HP EGR valve to time, and a rate of change of the opening degree of the LP EGR valve to time.

15. The system of claim 1, wherein the objective function is configured by multiplying the resultant object components and the resultant rate-of-change components by weights, respectively.

* * * * *